United States Patent [19]

Yata

[11] Patent Number: 5,715,019
[45] Date of Patent: Feb. 3, 1998

[54] VIDEO SIGNAL PROCESSING APPARATUS FOR PROMPTER

[75] Inventor: Kunio Yata, Omiya, Japan

[73] Assignee: Fuji Photo Optical Co., Ltd., Omiya, Japan

[21] Appl. No.: 811,051

[22] Filed: Mar. 4, 1997

[30] Foreign Application Priority Data

Mar. 8, 1996 [JP] Japan .................................. 8-080996

[51] Int. Cl.[6] ............................................. H04N 5/222
[52] U.S. Cl. .................................. 348/722; 345/124
[58] Field of Search ................................ 348/567, 722, 348/716, 718; 345/124; H04N 5/222

[56] References Cited

U.S. PATENT DOCUMENTS

| | | | |
|---|---|---|---|
| 1,959,038 | 5/1934 | Ridgway | 348/722 |
| 2,291,931 | 8/1942 | Troeger | 348/722 |
| 2,598,947 | 6/1952 | Thielen | 348/722 |
| 2,711,667 | 6/1955 | Simjian | 348/722 |
| 2,796,801 | 6/1957 | Simjian | 348/722 |
| 3,824,339 | 7/1974 | Eisenberg | 348/722 |
| 4,602,251 | 7/1986 | Sawada | 348/722 |

*Primary Examiner*—Howard W. Britton
*Attorney, Agent, or Firm*—Ronald R. Snider

[57] ABSTRACT

A video signal processing apparatus for a prompter of the present invention is capable of projecting a picture easy to see without a flicker of an image in the vertical direction during a vertical scrolling operation. An image data of a manuscript is displayed by interlace scanning, and the displayed manuscript is vertically scrolled at various speeds. The control circuit of the apparatus updates the uppermost horizontal line read from the image memory by one every time even field is read if the scrolling speed is 8 sec./screen. The control circuit updates the uppermost horizontal line read from the image memory when one of three consecutive even fields except a predetermined one is read if the scrolling speed is 12 sec./screen. In this manner, the uppermost horizontal line is sequentially replaced in order.

3 Claims, 5 Drawing Sheets

VIDEO SIGNAL PROCESSING APPARATUS FOR PROMPTER

BACKGROUND OF THE INVENTION

This application claims the priority of Japanese Patent Application No. 8-80996 filed on Mar. 8, 1996 which is incorporated herein by reference.

1. Field of the Invention

The present invention relates to a video signal processing apparatus for a prompter and, more particularly, to the signal processing operations for scrolling a manuscript in the vertical direction which is displayed on a display for a newscaster or the like in the course of shooting by a TV camera.

2. Description of the Related Art

A prompter device provided with a display disposed in the vicinity of the front surface a TV camera is used in TV broadcasting or the like. The prompter device can display various manuscripts which are read by newscaster, master or mistress of ceremonies, performer or the like. In this kind of device, the manuscript image data which are taken by a script camera are transmitted to an image memory, and are displayed on a display.

FIG. 5 shows an image memory and an example of data read processing. As shown in FIG. 5, an image memory M is so constituted as to store information for one screen which is composed of, for example, 183×241 pixels. The same data is read both as the data for an odd field and the data for an even field. In the case shown in FIG. 5, the horizontal line data at the memory address 1 is read in correspondence with a horizontal scanning line 21, the horizontal line data at the memory address 2 is read in correspondence with a horizontal scanning line 22, the horizontal line data at the memory address 3 is read in correspondence with a horizontal scanning line 23, and so forth in the odd (O) field. On the other hand, the horizontal line data at the memory address 1 is read in correspondence with a horizontal scanning line 284, the horizontal line data at the memory address 2 is read in correspondence with a horizontal scanning line 285, the horizontal line data at the memory address 3 is read in correspondence with a horizontal scanning line 286, and so forth in the even (E) field.

The data in the odd field and in the even field are displayed on a display by interlace scanning at every 1/60 second. It is possible to scroll the manuscript on the display vertically or horizontally, or turn the manuscripts page after page with a control button, thereby enabling a newscaster or the like to read the manuscript.

In a conventional video signal processing apparatus for a prompter device, when the scrolling speed is comparatively slow, for example, when one screen is moved every 8 seconds or every 12 seconds, the image in the vertical direction flickers so much as to be difficult to see. Since these scrolling speeds are frequently adopted, it is highly necessary to ameliorate this defect.

When the scrolling speed is 8 sec./screen, since about 240 horizontal line field data which are stored in the image memory M are displayed every 1/60 second, 8 (sec)÷240÷(1/60)=2, so that the uppermost horizontal line is replaced by the subsequent line in every two fields (in every other field). When the scrolling speed is 12 sec./screen, since about 240 horizontal line field data which are stored in the image memory M are displayed every 1/60 second, 12 (sec)÷240÷(1/60)=3, so that the uppermost horizontal line is replaced by the subsequent line in every three fields.

In FIG. 6, the positions of the uppermost horizontal lines when the scrolling speed is 8 sec./screen are indicated by the circled numeral 1. The position is updated when a new horizontal line is added in every odd field. As shown in FIG. 6, owing to interlace scanning, the uppermost scanning line (circled 1) becomes one line above the original position in the even field, then moves down by three lines in the next odd field. Consequently, when the uppermost horizontal line moves down by three lines, namely, when the even field is replaced by the odd field, the image flickers and becomes difficult to see.

FIG. 7 shows the positions of the uppermost horizontal lines when the scrolling speed is 12 sec./screen. In this case the position of the uppermost horizontal lines is updated whenever a new horizontal line is added in every two odd fields. Similarly to the case shown in FIG. 6, although the timing is different, the uppermost scanning line (circled 1) becomes one line above the original position in the even field, then moves down by three lines in the next odd field, which causes a flicker of the image.

SUMMARY OF THE INVENTION

Accordingly, it is an object of the present invention to eliminate the above-described problems in the related art and to provide a video signal processing apparatus for a prompter which is capable of projecting a picture easy to see without a flicker of an image in the vertical direction during a vertical scrolling operation.

To achieve this end, a video signal processing apparatus for a prompter provided in one aspect of the present invention comprises: an image memory for storing script data; a display for displaying image data read from the image memory by interlace scanning; and a control circuit for controlling the speed of vertically scrolling the manuscript on the display, selecting a field in which the movement of a horizontal scanning line updated on the screen is small when the vertical scrolling operation is executed by sequentially replacing the uppermost horizontal line read from the image memory in every field selected in accordance with the vertical scrolling speed, and updating the uppermost horizontal line when the field is read.

The control circuit can update the uppermost horizontal line when an even field is read if the scrolling speed is one at which the uppermost horizontal line read from the image memory is replaced in every other field. For example, when the vertically scrolling speed is 8 sec./screen, the uppermost horizontal line is updated by one when an even field is read. According to this system, the uppermost horizontal line is not shifted down to the subsequent third line and it is possible to display a manuscript by replacing the uppermost horizontal line by the subsequent horizontal line one by one at the time of vertical scroll.

The control circuit can update the uppermost horizontal line when one of three consecutive even fields except a predetermined one is read if the scrolling speed is one at which the uppermost horizontal line read from the image memory is replaced in every three fields. For example, when the vertically scrolling speed is 12 sec./screen, the uppermost horizontal line is updated by one when a first or second one of three consecutive even fields is read but it is not updated when the last even field is read. According to this system, the uppermost horizontal line is not shifted down to the subsequent third line and it is possible to display a manuscript by replacing the uppermost horizontal line by the subsequent horizontal line one by one at the time of vertical scroll.

The above and other objects, features and advantages of the present invention will become clear from the following description of the preferred embodiment thereof, taken in conjunction with the accompanying drawings.

DESCRIPTION OF THE PREFERRED EMBODIMENTS

Figure 1:
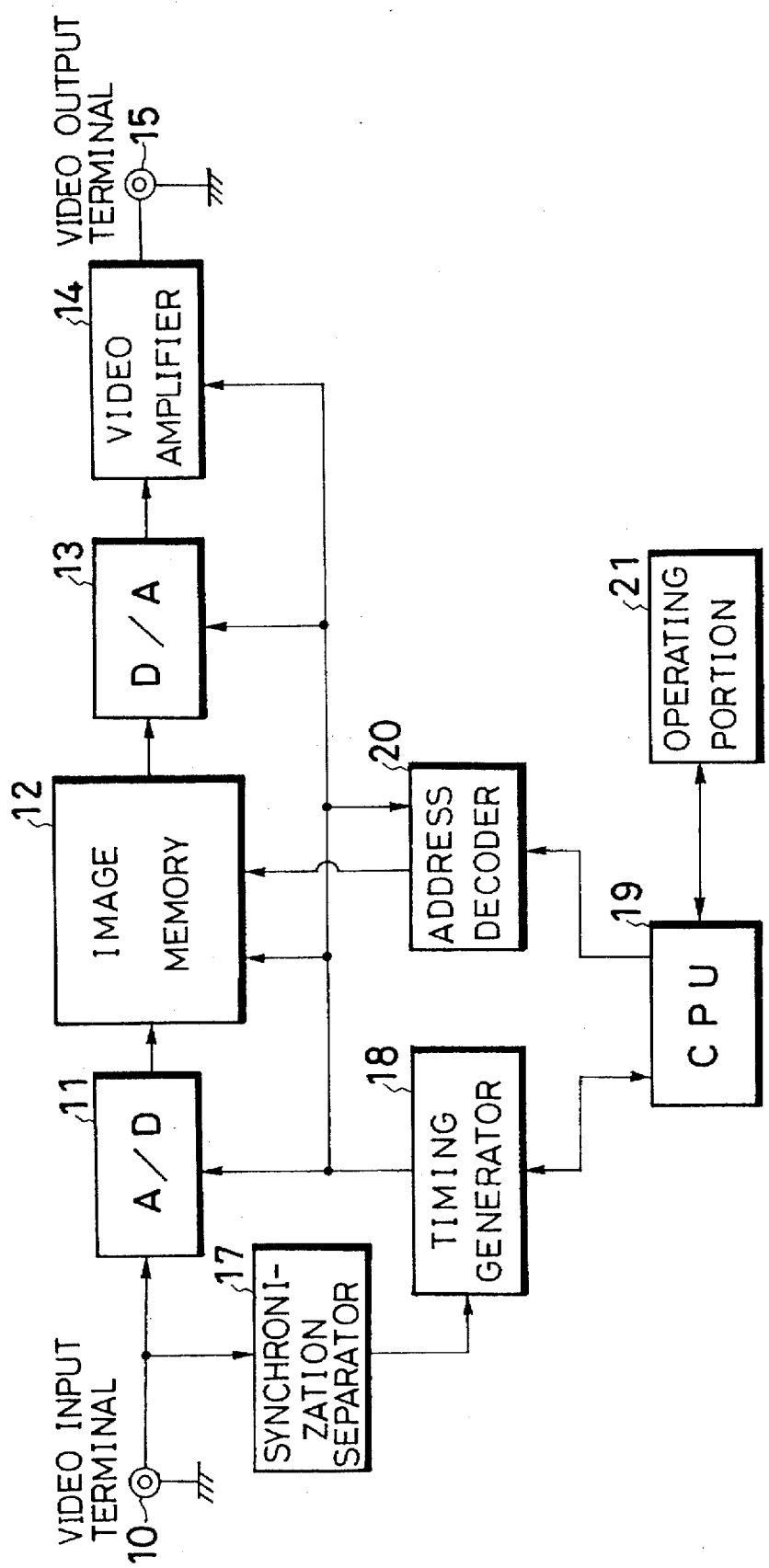
FIG. 1 is a block circuit diagram showing the entire structure of an embodiment of a video signal processing apparatus for a prompter according to the present invention.

FIG. 1 shows the entire structure of an embodiment of a video signal processing apparatus for a prompter according to the present invention. In FIG. 1, a video input terminal 10 is connected to a video output terminal of a script camera, and a script image taken by the script camera is supplied from the input terminal 10. An image memory 12 composed of an SRAM and the like is connected to the video input terminal 10 via an A/D converter 11. The image memory 12 can store several ten manuscripts. A video amplifier 14 is connected to the image memory 12 via a D/A converter, and a video output terminal 15 is connected to the video amplifier 14.

The apparatus is also provided with a synchronization separator 17 for inputting a video signal from the video input terminal 10 and separating a synchronization signal and a timing generator 18 for producing a timing signal from the synchronization signal. Various timing signals produced by the timing generator 18 are supplied to each circuit in the apparatus. The apparatus is further provided with a CPU 19 for controlling the general operation, and an address decoder 20 for selecting the address designated by the CPU 19. An operating portion 21 for executing a vertically or horizontally scrolling operation, or a page turning operation is connected to the CPU 19.

The operating portion 21 is capable of changing the vertically scrolling speed with a control knob or the like, and select a preset speed, for example, between 1 sec./screen and 12 sec./screen. The CPU 19 processes an image in accordance with the selected scrolling speed. The CPU 19 updates the uppermost horizontal line by one every time an even field is read if the scrolling speed is 8 sec./screen. On the other hand, if the scrolling speed is 12 sec./screen, the CPU 19 updates the uppermost horizontal line by one when the first two of three consecutive even fields is read but it does not update the line when the last even field is read.

The operation of the embodiment having the above-described structure will now be explained with reference to the flowchart shown in FIG. 2. When the writing mode is selected with a control button or the like, a video signal output from the script camera is input from the video input terminal 10 shown in FIG. 1, and the image signal data of the manuscript is stored into the image memory 12 via the A/D converter 11. Thereafter, when the reading mode is selected, the CPU 19 designates the address of the image memory 12 to the address decoder 20, and predetermined data are sequentially read from the image memory 12 and supplied to a display.

When the image is displayed, a vertical scrolling operation is enabled by the operating portion 21. When the scrolling speed of 8 sec./screen or 12 sec./screen is selected, the operation shown in FIG. 2 is executed by the CPU 19.

Figure 2:
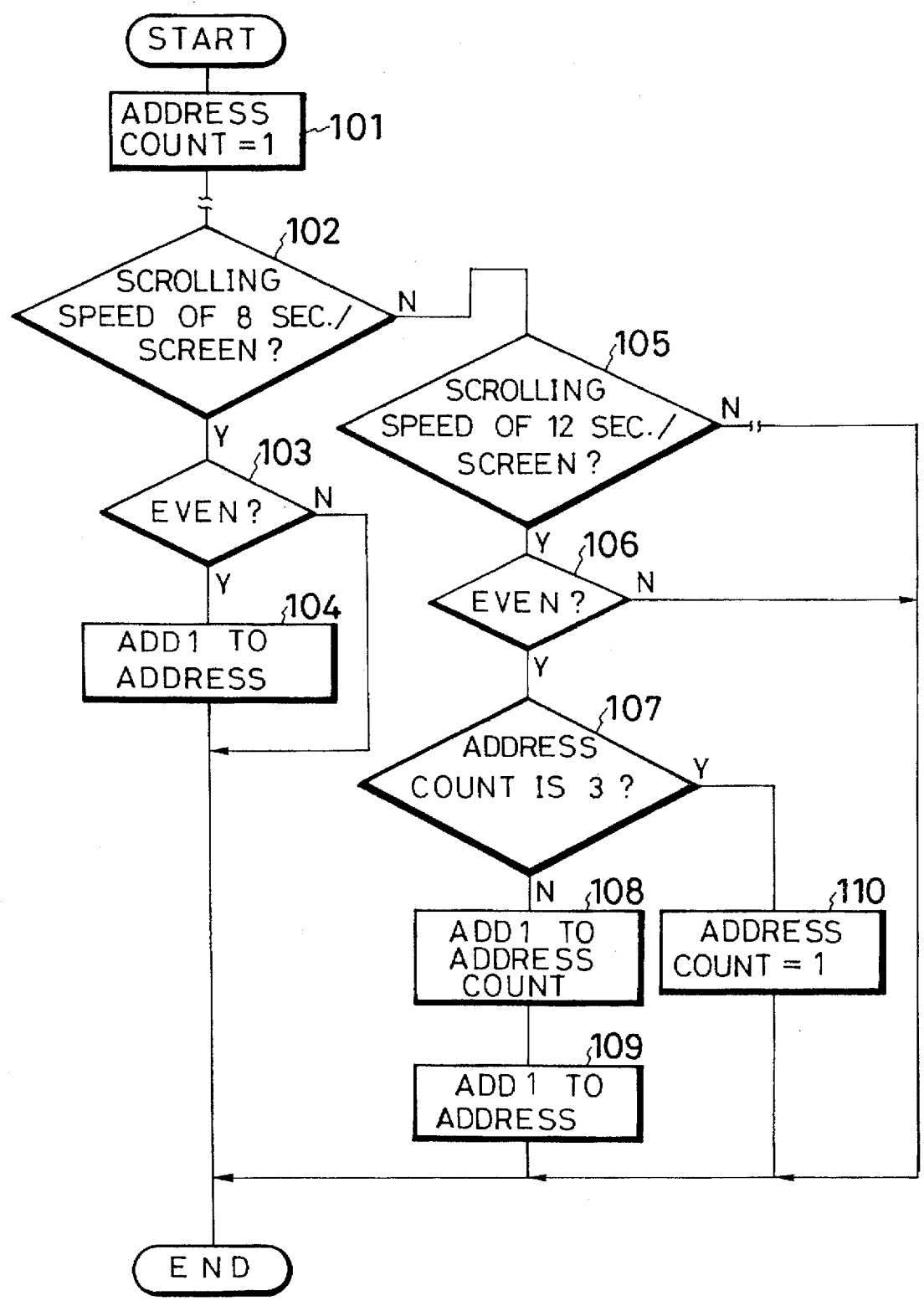
FIG. 2 is a flowchart of the operation of the CPU in the embodiment shown in FIG. 1.

In FIG. 2, an address counter is so set as to select a predetermined field at step 101. In this embodiment, the address count is set at 1 when the first even field from the start of scrolling is read. At step 102, it is judged whether or not the scrolling speed is set at 8 sec./screen, and if the answer is YES (Y), the process proceeds to step 103. At the step 103, judgement is made as to whether or not the subsequent field to be read is an even field, and if the answer is NO (odd field), the process is ended. On the other hand, if the answer is YES, 1 is added to the address of the uppermost horizontal line at step 104, and the display of one screen is updated. However, the uppermost line remains as it is in the first even field from the start of scroll.

Figure 3:
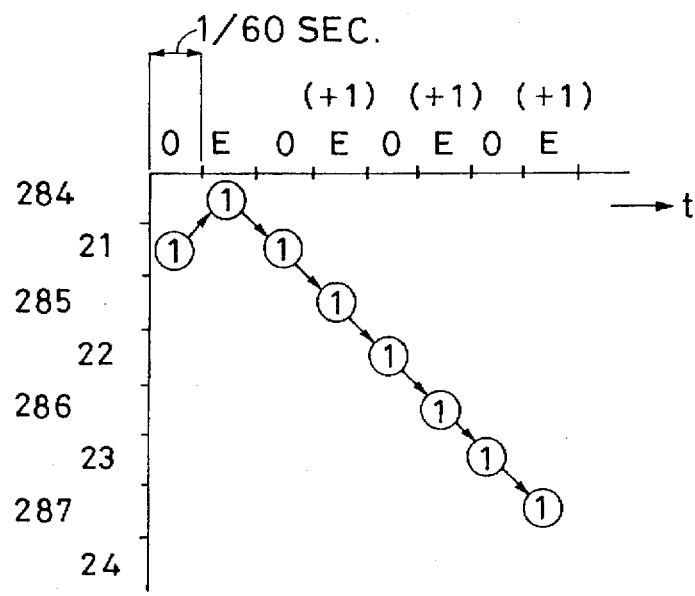
FIG. 3 is an explanatory view of the uppermost horizontal lines displayed when the scrolling speed is 8 sec./screen in the embodiment shown in FIG. 1.

FIG. 3 shows the uppermost horizontal lines displayed when the scrolling speed is 8 sec./screen. According to the above-described operation, 1 is added to the address of the uppermost horizontal line whenever an even field is read after the second even field from the start of scroll is read. Consequently, the uppermost horizontal line is sequentially replaced by the subsequent line, as shown in FIG. 3, so that there is no flicker of an image in the vertical direction.

If the answer is NO at the step 102 in FIG. 2, that is, if the scrolling speed is not set at 8 sec./screen, the process proceeds to step 105. At the step 105, it is judged whether or not the scrolling speed is set at 12 sec./screen, and if the answer is YES(Y), judgement is made as to whether or not the subsequent field to be read is an even field at step 106, and if the answer is YES, the process proceeds to step 107.

At the step 107, whether or not the address count is 3 is judged. If the answer is NO, that is, if the address count is 1 or 2, the process proceeds to step 108, and 1 is added to the address count. At step 109, 1 is added to the address of the uppermost horizontal line, and the display of one screen is updated. On the other hand, if the answer is YES at step 107, that is, if the address count is 3, the address count is returned to 1 at step 110 and the uppermost line is not updated.

Figure 4:
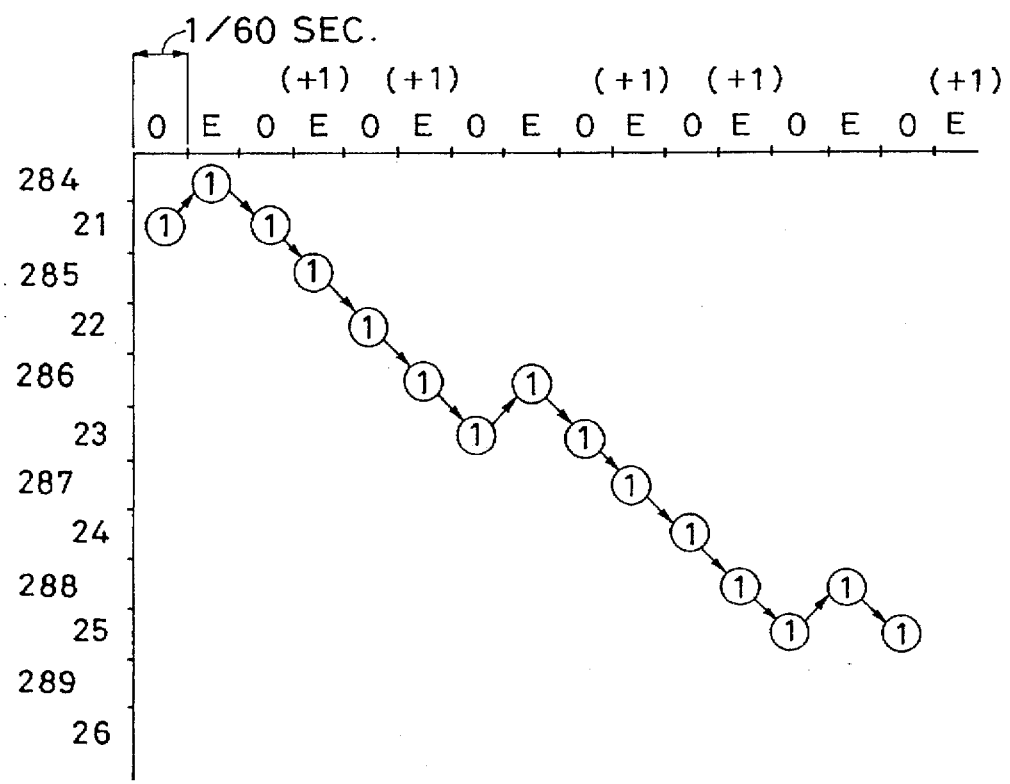
FIG. 4 is an explanatory view of the uppermost horizontal lines displayed when the scrolling speed is 12 sec./screen in the embodiment shown in FIG. 1.
Figure 5:
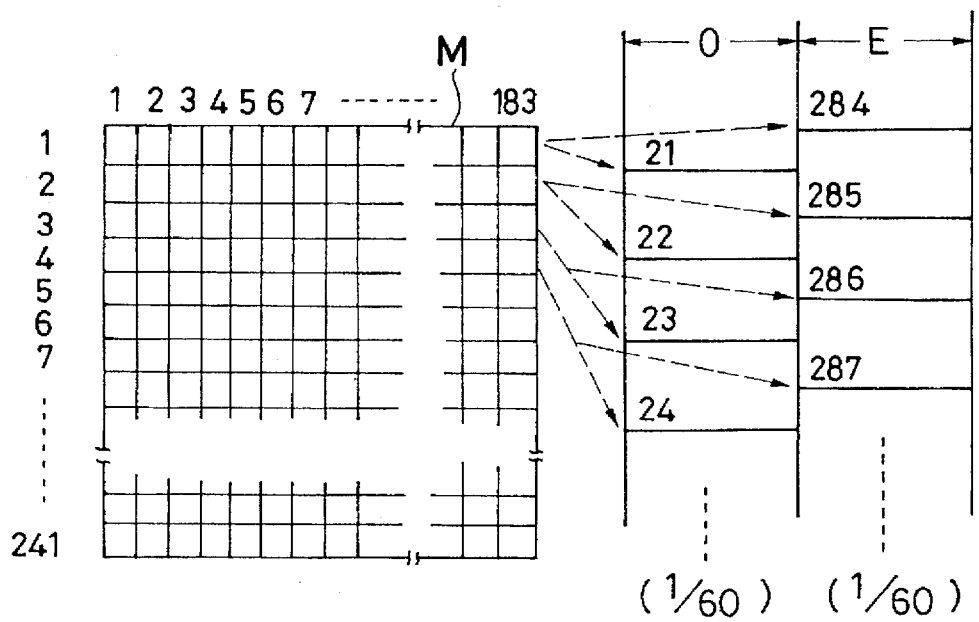
FIG. 5 is an explanatory view of an image memory and an example of data read processing in the embodiment and in a conventional apparatus.
Figure 6:
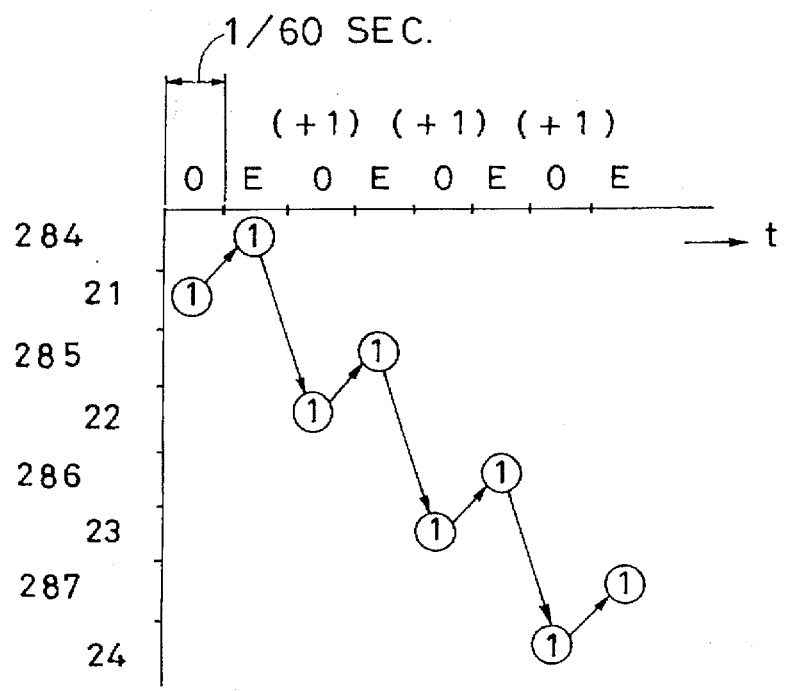
FIG. 6 is an explanatory view of the uppermost horizontal lines displayed when the scrolling speed is 8 sec./screen in a conventional apparatus.
Figure 7:
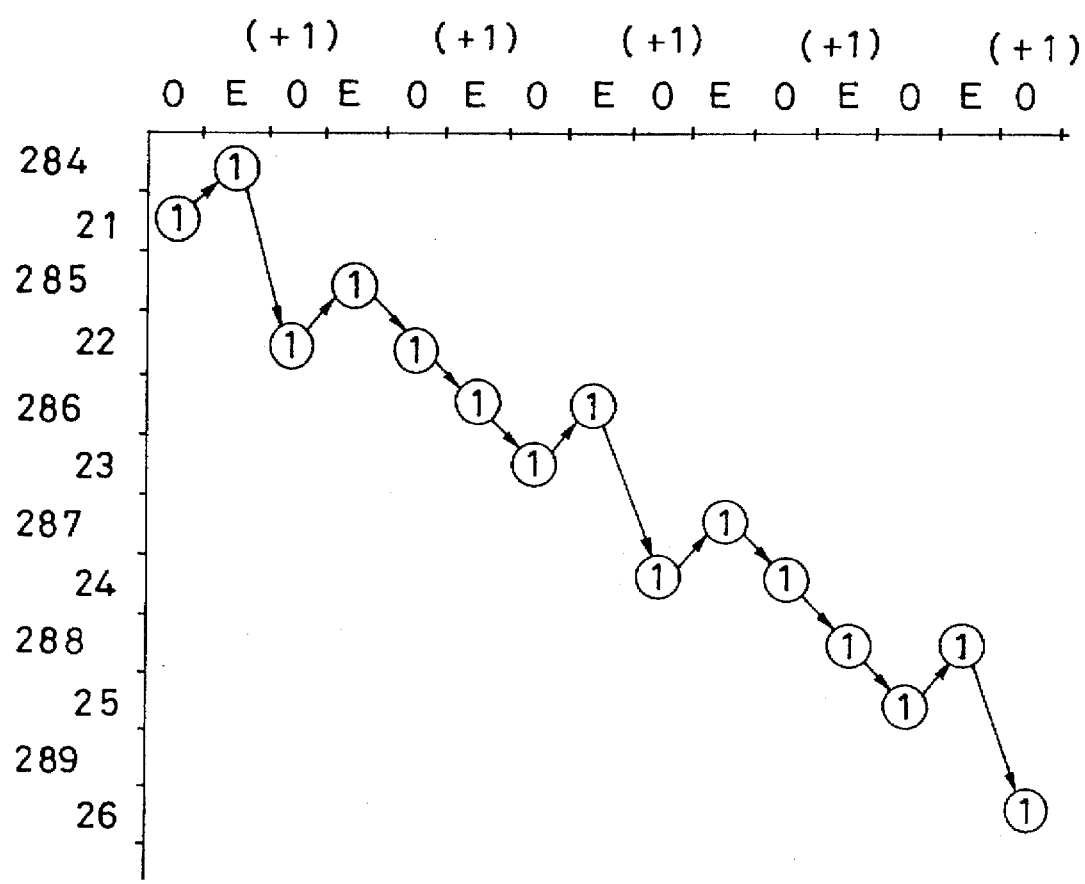
FIG. 7 is an explanatory view of the uppermost horizontal lines displayed when the scrolling speed is 12 sec./screen in a conventional apparatus.

FIG. 4 shows the uppermost horizontal lines displayed when the scrolling speed is 12 sec./screen. According to the above-described operation, 1 is added to the address of the uppermost horizontal line whenever a first or second one of three consecutive even fields is read but the uppermost horizontal line is not updated when the last even field is read. In this case, three consecutive even fields are counted with the second even field (the address count is 1) from the start of vertical scroll as a first thereof. According to this system, the uppermost horizontal line is not shifted down to the subsequent third line, so that there is no flicker of an image in the vertical direction.

In this embodiment, it is assumed that the image memory 12 is composed of about 240 lines and that the scrolling speed is 8 sec./screen or 12 sec./screen. However, it is also possible to adopt this operation control to other structures if the scrolling speed is one at which the uppermost horizontal line is replaced in every other field or one at which the uppermost horizontal line is replaced in every three fields.

As explained above, according to the present invention, since the uppermost horizontal line read from the image memory is updated by one every time an even field is read if the scrolling speed is 8 sec./screen, while the uppermost horizontal line is updated by one when one of three consecutive even fields except a predetermined one is read if the scrolling speed is 12 sec./screen, it is possible to prevent a flicker of an image in the vertical direction and produce a picture easy to see when a displayed image is vertically scrolled by interlace scanning of an NTSC system.

While there has been described what is at present considered to be a preferred embodiment of the invention, it will be understood that various modifications may be made thereto, and it is intended that the appended claims cover all such modifications as fall within the true spirit and scope of the invention.

What is claimed is:

1. A video signal processing apparatus for a prompter comprising:

an image memory for storing script data;

a display for displaying image data read from said image memory by interlace scanning; and a control circuit for controlling the speed of vertically scrolling a manuscript on said display, selecting a field in which the movement of a horizontal scanning line updated on the screen is small when the vertical scrolling operation is executed by sequentially replacing the uppermost horizontal line read from said image memory in every field selected in accordance with the vertical scrolling speed, and updating said uppermost horizontal line when said field is read.

2. A video signal processing apparatus for a prompter according to claim 1, wherein said control circuit updates said uppermost horizontal line when an even field is read if said scrolling speed is one at which said uppermost horizontal line read from said image memory is replaced in every other field.

3. A video signal processing apparatus for a prompter according to claim 1, wherein said control circuit updates said uppermost horizontal line when one of three consecutive even fields except a predetermined one is read if said scrolling speed is one at which said uppermost horizontal line read from said image memory is replaced in every three fields.

* * * * *